United States Patent
Chida

[19]
[11] Patent Number: 5,903,734
[45] Date of Patent: May 11, 1999

[54] MULTIMEDIA INFORMATION COMMUNICATION APPARATUS WHICH STORES RECEIVED INFORMATION IN AN ENCODED STATE

[75] Inventor: Makoto Chida, Kawasaki, Japan

[73] Assignee: Canon Kabushiki Kaisha, Tokyo, Japan

[21] Appl. No.: 08/906,159

[22] Filed: Aug. 5, 1997

Related U.S. Application Data

[63] Continuation of application No. 08/263,830, Jun. 22, 1994, abandoned.

[30] Foreign Application Priority Data

Jun. 22, 1993 [JP] Japan .................................... 5-150649
Jun. 15, 1994 [JP] Japan .................................... 6-132982

[51] Int. Cl.⁶ ........................................................ G06F 13/00
[52] U.S. Cl. ................................ 395/200.62; 395/200.61
[58] Field of Search .......................... 395/200.67, 200.77, 395/200.61, 62, 200.76, 200.62; 352/12, 25, 26

[56] References Cited

U.S. PATENT DOCUMENTS

| | | | |
|---|---|---|---|
| 5,231,492 | 7/1993 | Dangi et al. ............................ | 370/522 |
| 5,268,904 | 12/1993 | Umeda .................................... | 370/251 |
| 5,333,133 | 7/1994 | Andrews et al. ........................ | 370/62 |
| 5,333,266 | 7/1994 | Boaz et al. ............................. | 395/200.01 |
| 5,365,577 | 11/1994 | Davis et al. ............................ | 379/96 |
| 5,373,316 | 12/1994 | Ishinabe et al. ........................ | 348/15 |
| 5,463,616 | 10/1995 | Kruse et al. ............................ | 370/24 |
| 5,473,676 | 12/1995 | Frick et al. ............................. | 379/99 |

*Primary Examiner*—Mehmet B. Geckil
*Attorney, Agent, or Firm*—Fitzpatrick, Cella, Harper & Scinto

[57] ABSTRACT

Information received from a communication network and recorded during absence is stored in a storage unit in a state of being divided into blocks in accordance with a change in the transmission form including the transfer rate, the encoding method, and the like. Transmission conditions, such as the transfer rate, the encoding method, and the like, are stored in a control table for each stored block. Information relating to response messages to be transmitted in a recording operation during absence is encoded by one of various kinds of encoding methods, and the transfer rate during transfer of each message is assigned. Upon call reception, a message adapted to the capabilities of the communication partner's terminal is selected and transmitted.

12 Claims, 12 Drawing Sheets

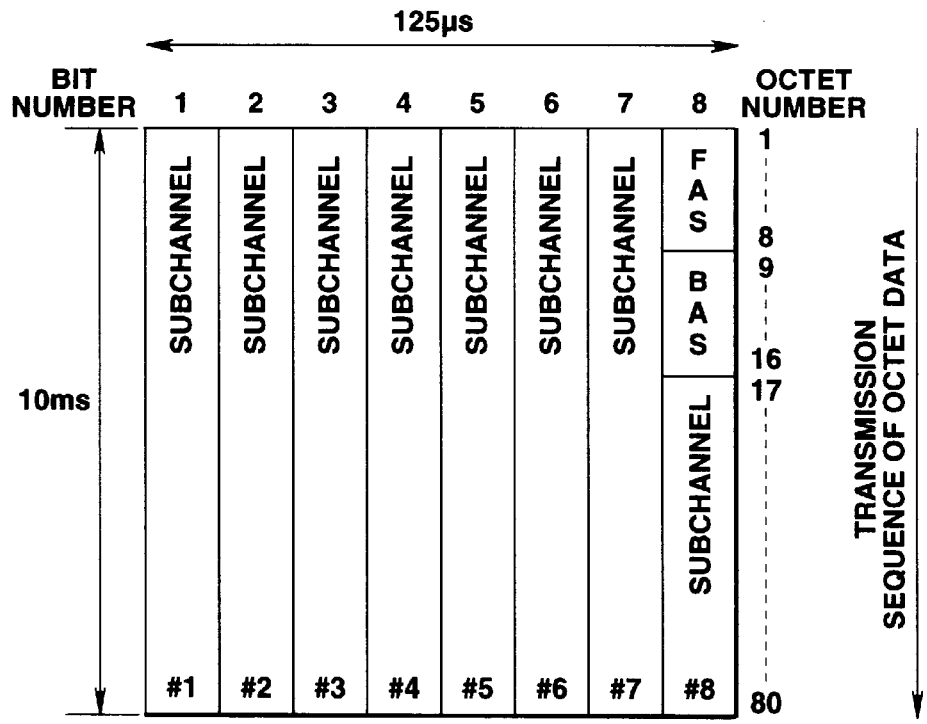
FIG.4(a)
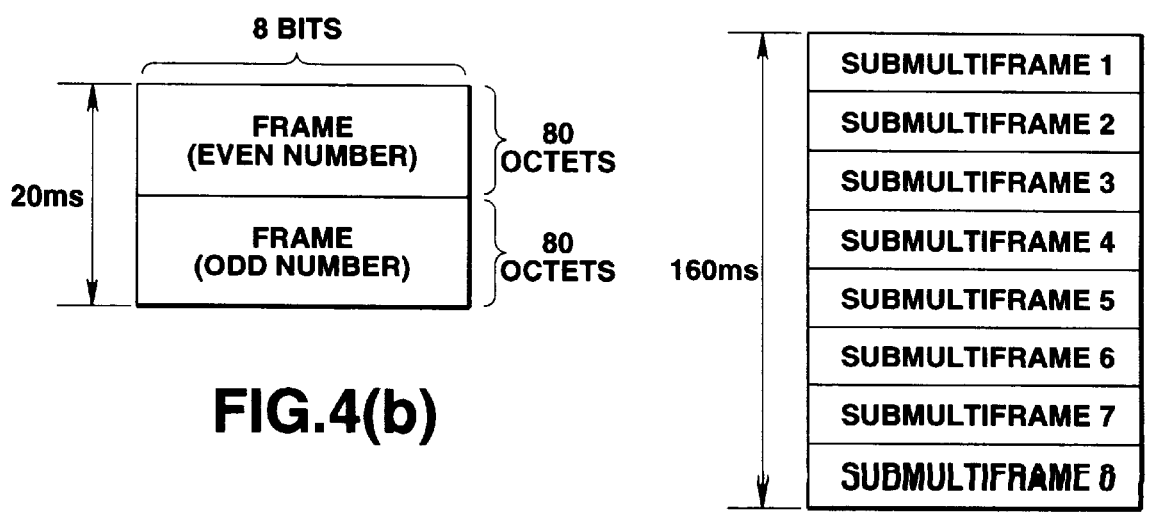
FIG.4(b)
FIG.4(c)

| FRAME | NUMBER OF SERVICE CHANNEL IN EACH FRAME | | | | | | | |
|---|---|---|---|---|---|---|---|---|
| | 1 | 2 | 3 | 4 | 5 | 6 | 7 | 8 |
| EVEN FRAME | Xeven | 0 | 0 | 1 | 1 | 0 | 1 | 1 |
| ODD FRAME | Xodd | 1 | A | E | C1 | C2 | C3 | C4 |

FIG.5(a)

| FRAME NUMBER | 1 | 3 | 5 | 7 | 9 | 11 | 13 | 15 |
|---|---|---|---|---|---|---|---|---|
| Xodd | N1 | N2 | N3 | N4 | N5 | R1 | R2 | TEA |

FIG.5(b)

| FRAME NUMBER | 0 | 2 | 4 | 6 | 8 | 10 | 12 | 14 |
|---|---|---|---|---|---|---|---|---|
| Xeven | 0 | 0 | 1 | 0 | 1 | 1 | R3 | R4 |

FIG.5(c)

| BIT NUMBER | b0 | b1 | b2 | b3 | b4 | b5 | b6 | b7 |
|---|---|---|---|---|---|---|---|---|
| CONTENTS OF BAS | ATTRIBUTE | | | | ATTRIBUTE VALVE | | | |

FIG.6(a)

| b0 | b1 | b2 | COMMAND OR CAPABILITY |
|---|---|---|---|
| 0 | 0 | 0 | VOICE-ENCODING COMMAND |
| 0 | 0 | 1 | TRANSFER-RATE COMMAND |
| 0 | 1 | 0 | IMAGE COMMAND AND OTHER COMMANDS |
| 0 | 1 | 1 | DATA COMMAND |
| 1 | 0 | 0 | TERMINAL CAPABILITY 1 |
| 1 | 0 | 1 | TERMINAL CAPABILITY 2 |
| 1 | 1 | 0 | UNDEFINED |
| 1 | 1 | 1 | ESCAPE CODE |

[LIST OF STORED DATA FILE]

| FILE NAME | LOCATION OF STORED DATA | | KIND OF DATA | TRANSFER RATE | ENCODING METHOD | COMMUNICATION CONTROL PARAMETERS |
|---|---|---|---|---|---|---|
| | START ADDRESS | DATA LENGTH | | | | |
| V0001 | 0x00000000h | 600kbyte | IMAGE DATA | 48kbps | H.261 | CIF, K=4 |
| A0001 | 0x00100000h | 200kbyte | VOICE DATA | 16kbps | LD-CELP | |
| V0002 | 0x00200000h | 200kbyte | IMAGE DATA | 32kbps | H.261 | QCIF, K=4 |
| A0002 | 0x00300000h | 200kbyte | VOICE DATA | 32kbps | AD-PCM | |
| V0003 | 0x00400000h | 30kbyte | IMAGE DATA | 48kbps | H.261 | QCIF, K=3 |
| A0003 | 0x00500000h | 10kbyte | VOICE DATA | 16kbps | LD-CELP | |
| V0004 | 0x00600000h | 20kbyte | IMAGE DATA | 32kbps | H.261 | QCIF, K=4 |
| A0004 | 0x00700000h | 20kbyte | VOICE DATA | 32kbps | AD-PCM | |
| A0005 | 0x00800000h | 40kbyte | VOICE DATA | 64kbps | μ-law | |
| A0006 | 0x00900000h | 35kbyte | VOICE DATA | 56kbps | μ-law | |
| V0005 | 0x00a00000h | 5kbyte | IMAGE DATA | 8kbps | H.261 | QCIF, K=4 |
| V0006 | 0x00b00000h | 100kbyte | IMAGE DATA | 32kbps | H.261 | QCIF, K=3 |
| A0007 | 0x00c00000h | 100kbyte | VOICE DATA | 32kbps | AD-PCM | |
| A0008 | 0x00d00000h | 1280kbyte | VOICE DATA | 128kbps | MPEG-Audio | |
| V0007 | 0x00f00000h | 1Mbyte | IMAGE DATA | — | JPEG | PICTURE-FRAME SIZE, METHOD QUANTIZED/ HUFFMAN-CODED VALUE |
| V0008 | 0x00100000h | 15Mbyte | IMAGE DATA | 1.5Mbps | MPEG-1 | SIF, N=12, M=3 |
| A0009 | 0x00200000h | 64kbyte | VOICE DATA | 64kbps | MPEG-Audio | |
| V0009 | 0x00210000h | 0.75Mbyte | IMAGE DATA | 75Mbps | MPEG-1 | SIF, N=15, M=3 |

[LIST OF MESSAGE]

| MESSAGE SERIAL NUMBER | NUMBER OF COMMUNI- CATION PARTNER'S TERMINAL | RECORDING-TIME INFORMATION | | FILE NAME | | NUMBER OF COMMUNI- CATION CHANNELS | DATA ATTRIBUTE | |
|---|---|---|---|---|---|---|---|---|
| | | START TIME | RECORDING TIME | IMAGE DATA | VOICE DATA | | IMAGE DATA | VOICE DATA |
| 0001 | 3333-1234, 4444-5678 | | 5" | V0003 | A0003 | 1ch | QCIF,K=3 | LD-CELP |
| 0002 | 3333-1234, 4444-5678 | | 5" | V0004 | A0004 | 1ch | QCIF,K=4 | AD-PCM |
| 0003 | ALL | | 5" | — | A0005 | 1ch | — | μ-law |
| 0004 | ALL | | 5" | V0005 | A0006 | 1ch | QCIF,K=4 | μ-law |
| 0005 | ALL | | 5" | | A0006 | 1ch | | μ-law |

FIG.8

[LIST OF RECORDING DURING ABSENCE]

| SERIAL NUMBER OF COMMUNI- CATION HISTORY | NUMBER OF COMMUNI- CATION PARTNER'S TERMINAL | RECORDING INFORMATION | | FILE NAME | | | | | | | | NUMBER OF COMMUNI- CATION CHANNELS | COMMUNI- CATION RESULT |
|---|---|---|---|---|---|---|---|---|---|---|---|---|---|
| | | START TIME | RECORDING TIME | IMAGE DATA | | | | VOICE DATA | | | | | |
| | | | | ① | ② | ③ | ④ | ① | ② | ③ | ④ | | |
| 000A | 1111-1234 | 9:00 | 2' 05" | V0001 | V0006 | | | A0001 | A0007 | | | 1ch | OK |
| 000B | 2222-5678 | 15:00 | 50" | V0002 | | | | A0002 | | | | 1ch | OK |
| 000C | 3333-9012 | 17:00 | | V0007 | | | | | | | | | OK |
| 000D | 4444-3456 | 23:00 | 2' 40" | V0008 | V0009 | | | A0008 | A0009 | | | | OK |

FIG.9

MULTIMEDIA INFORMATION COMMUNICATION APPARATUS WHICH STORES RECEIVED INFORMATION IN AN ENCODED STATE

This application is a continuation of application Ser. No. 08/263,830 filed Jun. 22, 1994, now abandoned.

BACKGROUND OF THE INVENTION

1. Field of the Invention

This invention relates to a multimedia communication apparatus for performing transmission/reception of image information and voice information via a digital communication network, and more particularly, to a multimedia information communication apparatus which is suitable for storing encoded data.

2. Description of the Related Art

In the case of using a conventional analog telephone circuit, a telephone can transmit only voice, and data can be transmitted only at a low speed.

Recently, however, as a result of progress in communication technology, semiconductor technology and optical technology, digital networks have been provided, and it becomes possible to transmit data having a large capacity at a high speed.

Digital transmission has features in that, for example, the same level of data quality can be maintained without degrading the data quality during data transmission, a particular transmission channel corresponding to the characteristics of the medium of transmitted data is not required, and therefore all media can be dealt with. Hence, it becomes possible to perform transmission between complex media terminals. As a result, multimedia communication apparatuses have appeared, in which a telephone can silmultaneously transmit images as well as voice.

Transmitted voice data may comprise 64 Kbps ($\mu$-law, A-law), 64 Kbps/56 Kbps/48 Kbps (SB-ADPCM), 32 Kbps (AD-PCM), 16 Kbps, 8 Kbps, or the like.

Transmitted image data having a large capacity is recuded to data having a small capacity after being subjected to band compression using various methods, such as movement compensation, frame skipping, interframe compensation, intraframe compensation, DCT (discrete cosine transform), vector quantization transform, and the like, so that the image data can be transmitted through a digital network. H. 261 recommended by ITU-T (which succeeds CCITT) is an image encoding method in which data can be transmitted at a transmission speed of 64 Kbps of a basic interface of an ISDN (integrated services digital network). International standardization by the ITU-T, and the like has been intended so that mutual communication can be performed between terminals which deal with voice data and image data, and service provisions, protocol provisions, provisions for the configuration of multimedia multiplexed frames for AV (audiovisual) services, such as video telephones, video conferences, and the like using a digital network, have been announced as H. 320, H. 242, H. 221, and the like recommended by the ITU-T.

In H. 221, the frame configuration, exchange of terminal capabilities, and code allocation of an FAS (frame alignment signal) and a BAS (bit allocation signal) in a communication mode in AV series for 64 Kbits to 1920 Kbits are defined.

In H. 242, protocols for exchange of capabilities between AV terminals using a BAS, the switching of the communication mode, and the like are defined. In H. 320, system aspects for all AV services are defined.

In the above-described recommendations, methods for performing communication of multimedia, comprising images, voice, data, and the like, between terminals according to procedures, such as a sequence of in-channel exchange of terminal capabilities using a BAS, a mode-switching sequence by assigning a communication mode, and the like, after setting of an end-to-end physical connection and in-channel establishment of synchronization using an FAS are provided.

However, methods for changing capabilities of a terminal in accordance with a situation, and methods of selecting a communication mode within the range of exchanged capabilities are not provided.

In multimedia communication, the information transfer speed for voice information is determined by assigning a voice-encoding method, and the transfer speed of data information is determined by assigning the value of the transfer speed when data information is used. The transfer speed for image information is obtained by subtracting the transfer speed of voice information and the transfer speed of data information from the information transfer speed of the entire communication channel which has been set.

A function of performing a recording operation during absence is desired in multimedia communication apparatuses, such as video telephones, and the like, as well as in ordinary telephone sets which transmit only voice.

Response messages (images and/or voice) to be transmitted in an recording operation during absence may be subjected analog recording on a magnetic tape, or the like, and image information and voice information received during absence may be decoded into analog signals and may be recorded on a magnetic tape. However, such an approach results in a large amount of stored information, thereby causing troublesome control of stored information, the necessity of the control of a tape-driving system, and an increase in the size of the entire system. Furthermore, alanog recording causes inconvenience in reutilization of received images, and the quality of images and voice is degraded due to reproduction by decoding.

Accordingly, it is desirable to perform digital recording of received signals, particularly, received image signals, and to store the signals in a recording medium in an encoded state.

According to the above-described recommendations, capabilities of terminals in communication are exchanged when starting the communication. Capabilities to be exchanged between terminals comprise, for example, kinds of information which can be dealt with (images, voice and data), encoding methods, and the transfer rate of each information to be transmitted. The transmission-side terminal transmits information, which belongs to the kind of information selected within the range of capabilities of the reception-side terminal, in permissible encoding method and transfer rate in accordance with the result of the exchange of capabilities between the terminals.

Even during communication, the kind of information to be transmitted, the encoding method, the transfer rate, and the like can be changed within permissible ranges. Accordingly, the comminication partner's terminal may change any of the transmission capabilities in the course of a recording operation during absence. Hence, for example, even if the kind of communicated information is changed, information before and after the change must be stored in a correlated state, and must be appropriately reproduced whenever necessary.

A response message transmitted in a recording operation during absence must be adapted to the capabilities of the communication partner's terminal. That is, the message must be encoded in an encoding method which can be decoded by the communication partner's terminal. If the communication partner's terminal does not have capabilities to receive the response message, the response message cannot be transmitted to the communication partner's terminal (or cannot be reproduced by the communication partner's terminal).

SUMMARY OF THE INVENTION

It is an object of the present invention to provide a multimedia information communication apparatus which solves the above-described problems.

It is another object of the present invention to provide a multimedia information communication apparatus which can appropriately reproduce multimedia information even if any of transmission capabilities of a multimedia information communication terminal in communication is changed when storing multimedia inmformation from the multimedia information communication terminal in communication in a storage unit.

It is still another object of the present invention to provide a multimedia information communication apparatus which can automatically transmit a response message corresponding to transmission capabilities of a terminal in communication to the multimedia information communication apparatus at the terminal in communication during absence.

It is yet another object of the present invention to provide a multimedia information communication apparatus which has new functions.

According to one aspect, the present invention which achieves these objectives relates to a multimedia information communication apparatus comprising storage means for storing received information in an encoded state, comprising storage control means for storing received information having the same transmission form as one block in the storage means, and control means for controlling at least one block of received information in a single communication operation in accordance with the transmission form.

According to another aspect, the present invention relates to a multimedia information communication apparatus for transmitting a message for call reception from a communication partner's terminal, comprising message storage means for storing a plurality of messages having at least different encoded states and transfer rates, retrieval means for retrieving a message corresponding to the capabilities of the communication partner's terminal from the message storage means, and transmission means for transmitting the message retrieved by the retrieval means to the communication partner's terminal.

The foregoing and other objects, advantages and features of the present invention will become more apparent from the following detailed description of the preferred embodiment taken in conjuction with the accompanying drawings.

BRIEF DESCRIPTION OF THE DRAWINGS

FIGS. 4(a) through 4(c) are diagrams illustrating the multiframe structure of provision H. 221;

FIGS. 5(a) through 5(c) are diagrams illustrating the bit structure of an FAS;

FIGS. 6(a) and 6(b) are diagrams illustrating the bit structure of a BAS;

FIG. 7 is a diagram illustrating a form of controlling information stored in a storage unit 45 shown in FIG. 1;

FIG. 8 is a diagram illustrating a control table of response messages in a mode of recording during absence in the embodiment;

FIG. 9 is a diagram illustrating a control table of recording during absence stored in the storage unit 45 shown in FIG. 1;

DETAILED DESCRIPTION OF THE PREFERRED EMBODIMENT

A preferred embodiment of the present invention will now be described with reference to the drawings.

Figure 1:
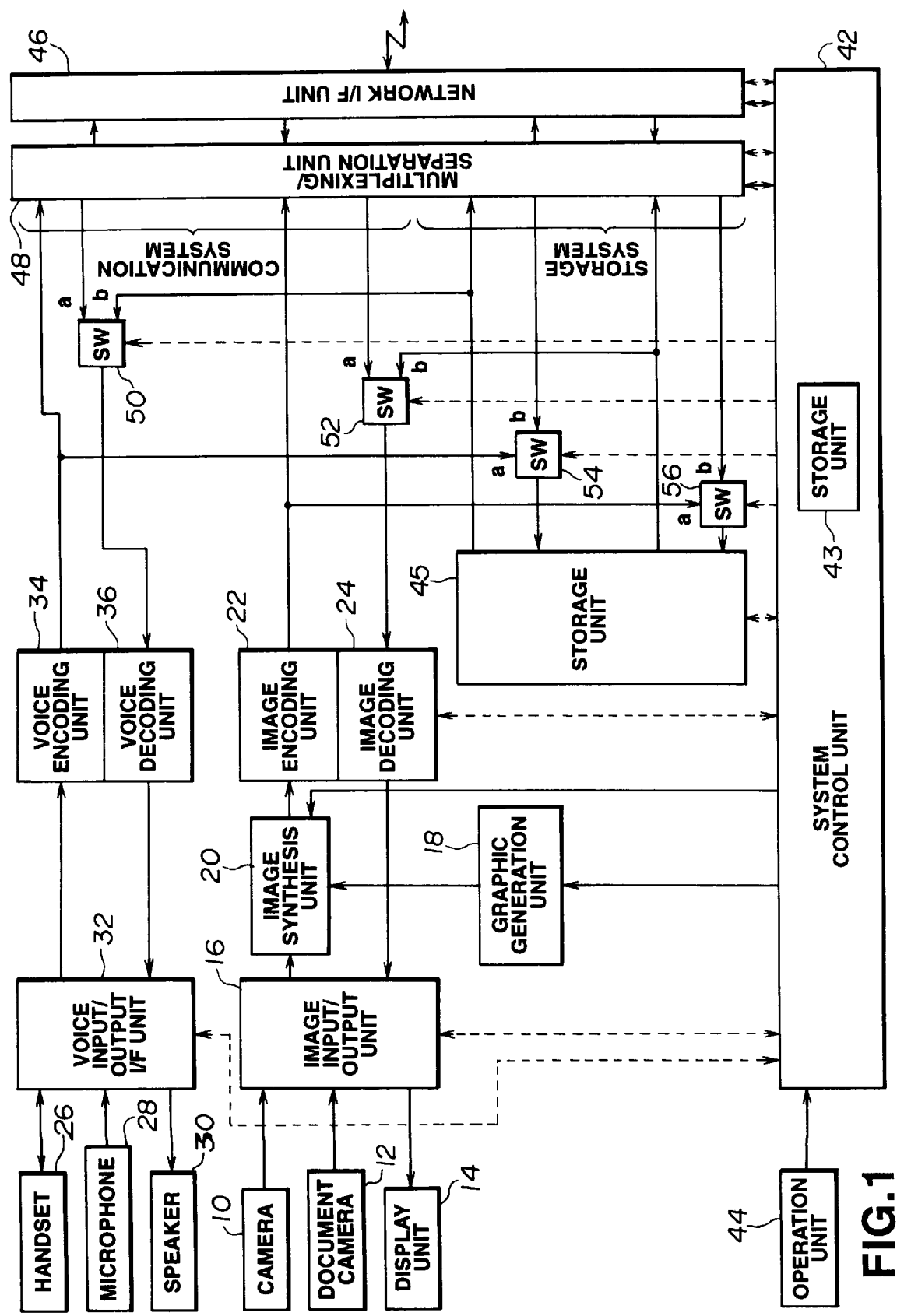
FIG. 1 is a block diagram illustrating the configuration of a video telephone apparatus according to an embodiment of the present invention.

FIG. 1 is a block diagram illustrating the configuration of a video telephone apparatus, serving as a multimedia information communication apparatus, according to the embodiment.

In FIG. 1, a camera 10 photographs members of a meeting. A document camera 12 photographs a document, such as a drawing, or the like, for the meeting. An image display unit 14 comprises a CRT (cathode-ray tube), a liquid-crystal display unit, or the like. An image input/output unit 16 selects one of images output from the camera 10 and the document camera 12 for transmission, and supplies the image display unit 14 with an image obtained by selecting and synthesizing images output from the camera 10 and the document camera 12 and received images in order to display the image. A graphic generation unit 18 generates graphic data to be superposed on the image to be transmitted. An image synthesis unit 20 selects and synthesizes the image output from the image input/output unit 16 and the image generated by the graphic generation unit 18. An image encoding unit 22 encodes an image signal to be transmitted, which is output from the image synthesis unit 20. The image encoding unit 22 performs band compression of the image signal input from the image synthesis unit 20 by performing movement compensation, frame skipping, interframe compensation, intraframe compensation, DCT, vector quantization transform, and the like. H. 261 recommended by the ITU-T is an encoding method which can transmit data at 64 Kbps of a basic interface of an ISDN. A handset 26 comprises a microphone and a speaker. There are also shown a microphone 28 and a speaker 30. A voice input/output interface unit 32 performs an interfacing operation with the handset 26, the microphone 28 and the speaker 30. The voice input/output interface unit 32 performs not only switching of the voice input/output for the handset 26 and the speaker 30, but also the adjustment of the sound level, the detection of on-hook/off-hook of the handset 26, echo cancel processing, and processing of generating a tone, such as a dial tone, a ringing tone, a busy tone, a call-reception tone, or the like. A voice encoding unit 34 encodes a voice signal to be transmitted from the voice input/output interface unit 32. A voide decoding unit 36 decodes a received encoded voice signal, and outputs the decoded signal to the voice input/output interface unit 32. The transmission speed and the encoding method comprise 64 Kbps PCM (A-law), 64 Kbps PCM (µ-law), 7 KHz audio (SB-ADPCM), 32 Kbps ADPCM, 16 Kbps (for example, LD-CELP), 8 Kbps, or the like.

A system control unit 42 controls the entire video telephone apparatus, and supplies the graphic generation unit 18 with data necessary for generating a graphic image. The system control unit 42 stores format information relating to graphic images generated by the graphic generation unit 18 in a storage unit 43 incorporated therein.

An operation unit 44 inputs various kinds of instruction information to the system control unit 42, and comprises, for example, a keyboard, a touch panel, a digitizer and a pointing device, such as a mouse or the like. A storage unit 45 comprises a large-capacity memory for storing information (encoded image data, encoded voice data, and the like received from each terminal in communication, or stored in the user's own terminal as response messages to be transmitted in recording operations during absence) during a mode of recording in absence.

A network interface unit 46 connects the apparatus to a communication network, such as an ISDN or the like. A multiplexing/separation unit 48 multiplexes image information, voice information and control information to be transmitted, in accordance with the H. 221 format, supplies the network interface unit 46 with the resultant data, and seperates received information supplied from the network interface unit 46 into image information, voice information, data information and control information.

A selection switch 52 selects one of received information input via the multiplexing/separation unit 48 (contact "a") and reproduced image information stored in the storage unit 45 (contact b), and supplies an image decoding unit 24 with the selected information. A selection switch 50 selects one of received encoded voice information input via the multiplexing/separation unit 48 (contact "a") and reproduced voice information from the storage unit 45 (contact b), and supplies a voice decoding unit 36 with the selected information. A selection switch 56 selects one of image information to be transmitted output from the image encoding unit 22 (contact "a") and received image information input via the multiplexing/separation unit 48 (contact b), and supplies the storage unit 45 with the selected information. A selection switch 54 selects one of voice information to be transmitted output from the voice encoding unit 34 (contact "a") and received voice information input via the multiplexing/separation unit 48 (contact b), and supplies the storage unit 45 with the selected information.

The system control unit 42 controls the switching operations of the selection switches 50, 52, 54 and 56. That is, the system control unit 42 connects the selection switches 54 and 56 to contacts b in a recording operation in a mode of recording in absence, and contacts the selection switches 50 and 52 to contacts b in an operation of reproducing contents recorded in absence.

Data (relating to a text, a document or the like), control information, pointing data and still-picture data are transferred from the multiplexing/separation unit 48, and are stored in the storage unit 45. In a reproducing operation, stored data are read, still-picture data is decoded, pointing data is converted into information relating to a mark and coordinates, data relating to a text or a document is converted by an application which can deal with the data format.

The flow of an image signal and a voice signal in the apparatus shown in FIG. 1 will now be briefly described.

One of image data input from the camera 10 and the document camera 12 is selected by the image input/output unit 16, and the selected data is supplied to the image synthesis unit 20. The image synthesis unit 20 synthesizes the image data from the image input/output unit 16 with graphic image data generated by the graphic generation unit 18. The images are synthesized, for example, in the following manner. That is, a video memory (not shown) included in the image synthesis unit 20 allocates a storage region, comprising a plurality of bits, for each pixel (picture element), a bit plane comprising a few signicant bits is set as a storage region for graphic data from the graphic generation unit 18, and a region, which comprises a few remaining bits in the depth of the video memory, and which is not allocated as the storage region for graphic data, is set as a storage region for image data from the image input/output unit 16. That is, the number of colors of image data from the image input/output unit 16 is less than the number of colors which can be expressed by the bit depth of the video memory.

By selecting a bit plane output from the video memory, one of image data input from the camera 10 or the document camera 12, and graphic data generated by the graphic generation unit 18 can be selected and output by the control of the system control unit 42. As a result, a synthesized image can be obtained.

In another synthesis method, one of code data is allocated to image data from the image input/output unit 16 when graphic data is written in a text VRAM included in the system control unit 42. When code data other than the allocated code data is read via the graphic generation unit 18, the image synthesis unit 20 converts the code data into color data, and transfers the color data to the image encoding unit 22. When the allocated code data is read, image data from the image input/output unit 16 is transferred to the image encoding unit 22. Thus, images are synthesized.

The conversion of code data into color data is performed using a color look-up table (not shown) included in the image synthesis unit 20. Graphic data corresponding to color data, whose correspondence with code data is provided in the look-up table, is output for each input of code data.

The image synthesis unit 20 supplies the image encoding unit 22 with image data selected or synthesized according to one of the above-described methods. The image encoding unit 20 encodes the image signal output from the image synthesis unit 20 in an encoding mode which conforms to a control signal from the system control unit 42 and internal determination, and outputs the resultant signal to the multiplexing/separation unit 48 and contact "a" of the selection switch 56.

A voice signal obtained from the microphone of the handset 26, or the microphone 28 is input to the voice encoding unit 34 via the voice input/output interface unit 32. The voice encoding unit 34 supplies the multiplexing/separation circuit 48 and contact "a" of the selection switch 54 with encoded voice data.

By connecting the selection switches 54 and 56 to contacts "a", each input image data from the camera 10 or the document camera 12, each image data obtained by synthesizing the input image data with graphic data generated from the graphic generation unit 18 by the image synthesis unit 20, and each voice data obtained from the handset 26 or the microphone 28 can be stored in the storage unit 45. It is thereby possible to store response messages to be transmitted in recording operations during absence in the storage unit 45.

The multiplexing/separation unit 48 multiplexes encoded signals from the image encoding unit 22 and the voice encoding unit 34, and a control command from the system control unit 42, and outputs the resultant signal to the network interface unit 46. The network interface unit 46 outputs the signal recorded from the multiplexing/separation unit 48 to a connected communication network in a predetermined format.

The multiplexing/separation unit 48 also has the function of selecting one of signal transfer between the multiplexing/separation unit 48, and the image encoding unit 22, the image decoding unit 24, the voice encoding unit 34 and the voice decoding unit 36, signal transfer between the multiplexing/separation unit 48 and the storage unit 45, and signal transfer between the multiplexing/separation unit 48 and the system control unit 42.

A signal received from the communication network is supplied from the network interface unit 46 to the multiplexing/separation unit 48. The multiplexing/separation unit 48 separates a encoded image signal, an encoded voice signal, data (of a text, a document, or the like) signal, and a control command from the received signal, supplies the encoded image signal to contact "a" of the selection switch 52 and contact b of the selection switch 56, and supplies the data and the control command to the system control unit 42.

The system control unit 42 connects the selection switches 50 and 52 to contacts "a" when received information must be reproduced and output, and connects the selection switches 54 and 56 to contacts b when received information must be stored in the storage unit 45.

The image decoding unit 24 decodes the encoded image signal from the selection switch 52, and supplies the image input/output unit 16 with the resultant signal. The image input/output unit 16 selects and synthesizes image signals from the camera 10 and the document camera 12, and the image signal from the image decoding unit 24, and supplies the image display unit 14 with the resultant signal. The image input/output unit 16 performs, for example, picture-in-picture display, or insertion of the obtained image in the corresponding window in a window display system, as synthesis processing. Thus, the input image and/or the received image (including an image recorded during absence) are displayed on the picture surface of the image display unit 14.

The voice decoding unit 36 decodes the encoded voice signal from the selection switch 50, and supplies the resultant signal to the speaker of the handset 26, and/or the speaker 30 via the voice input/output interface unit 32. It is thereby possible to hear voice (including voice recorded during absence) from the communication partner.

Figure 10:
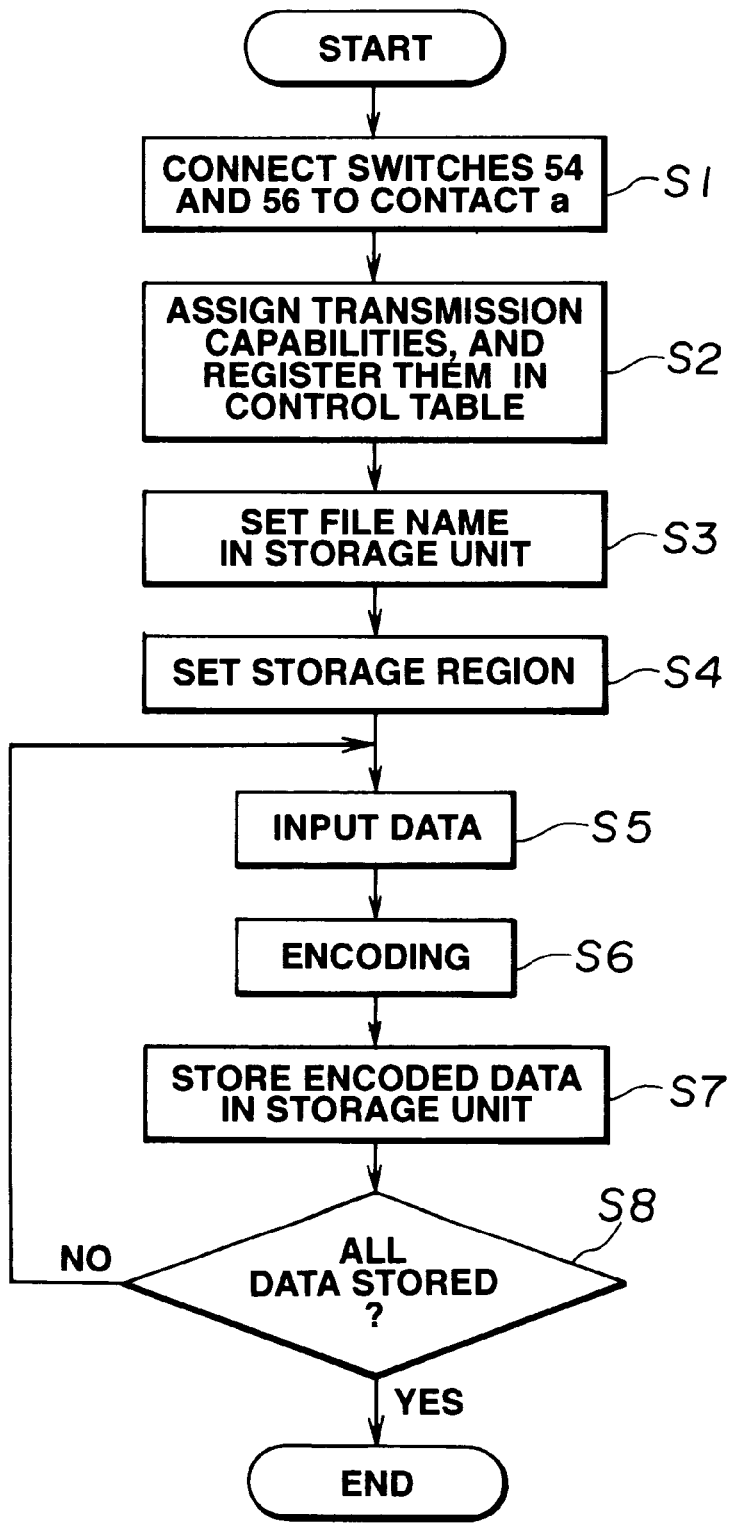
FIG. 10 is a flowchart illustrating processing performed when registering a message from a communication partner.

Each of the image encoding unit 22 and the voice encoding unit 34 comprises a plurality of kinds of encoding circuits corresponding to various kinds of encoding methods, which will be described later with reference to FIG. 7, and performs an encoding operation using a corresponding encoding circuit in accordance with assignment of an encoding method in the flowchart shown in FIG. 10.

H. 261 recommended by the ITU-T, MPEG (Motion Picture Image Coding Experts Group), or JPEG (Joint Photographic Experts Group) may be used as the encoding method of the image encoding unit 22.

The above-described encoding methods will now be described. However, the encoding method of the image encoding unit 22 is not limited to one of these methods, but other image encoding methods may, of course, be used.

H. 261 recommended by the ITU-T is one of image compression methods. H. 261 has already been recommended, and provides an image encoding method in communication. If a video telephone apparatus conforms to this recommendation, that apparatus can also communicate with any other video telephone apparatus which conforms to any other recommendation.

A plurality of different standards, such as NTSC, PAL, digital television standards, and the like, are present for video signals. Hence, in H. 261, a video signal format which is common throughout the world is adopted, so that communication can be performed between any apparatuses in the world. This format is termed a CIF format, in which the number of samples equals 352 pixels×288 lines for luminance Y, and equals 176 pixels×144 lines for chrominances Cr and Cb. ¼ of the CIF format is termed a QCIF format, in which the number of samples equals 176 pixels×144 lines for luminance Y, and equals 88 pixels×72 lines for chrominances Cr and Cb. A GOB format is defined such that the number of samples equals 176 pixels×48 lines for luminance Y, and equals 88 pixels×24 lines for chrominances Cr and Cb, and corresponds to $\frac{1}{12}$ of the CIF format and $\frac{1}{3}$ of the QCIF format.

Compression methods comprise, for example, intraframe encoding in which utilizing the facts that, for example, there is a strong correlation between pixels in an image present in the natural world, and low-frequency components are dominant and high-frequency components are minorities, data within a frame is divided into blocks of 8 pixels×8 pixels, and is subjected to two-dimensional DCT, interframe encoding in which the difference between frames is obtained when there is a strong correlation between image blocks at the same position of the preceding frame and the current frame, and each block of 8 pixels×8 pixels is subjected to two-dimensional DCT using the difference value, movement compensation in which the movement of an analogous image block from the preceding frame to the current frame is detected, and only information relating to the amount and the direction of the movement is transmitted without transmitting the image data itself, whereby the amount of generation of data is reduced, zero-run-length encoding which utilizes the fact that the coefficient value for each frequency after DCT is generated in low-frequency regions, but is hardly generated and therefore zero values continue in high-frequency regions, quantization in which the amount of generation of data is adjusted by changing the width of quantization steps for data in accordance with the amount of generation of data, variable-length encoding in which the amount of generated data is reduced by allocating short code values for data pattern having high frequency of generation, and allocating long code values for data pattern having low frequency of generation, frame skipping in which part of image data is omitted.

As described above, a plurality of compression techniques are combined, so that moving images can be transmitted even in communication having a low transfer rate.

In an interframe encoding mode (hereinafter termed an INTER mode), a high compression ratio can be achieved when correlation between frames is high. Hence, when correlation between frames has at least a predetermined level, the INTER mode is adopted. When correlation between frames has a level less than the predetermined level, intraframe encoding mode (hereinafter termed an INTRA mode) is adopted. The degree of correlation is determined, for example, from the degree of movement of an object between frames.

In the INTER mode, quantization errors representing the difference between quantization at the transmission side and quantization at the reception side are accumulated at the terminal of the reception side, and the value of the accumulated errors is large when the step of quantization is coarse. Hence, in general, INTRA modes are periodically disposed in units of a block. INTRA modes are also periodically disposed in order to prevent propagation of transmission errors. It is considered to be desirable to provide frames, in each of which all blocks are subjected to intraframe encoding, with an appropriate interval. This processing is called entire INTRA processing. According to the entire INTRA processing, it is possible to prevent decoding errors and quantization errors, and to refresh the picture surface.

Next, a description will be provided of MPEG. MPEG provides an image encoding method mainly for digital storage media for which standardization is under way by the ISO (International Organization for Standardization)/IEC (International Electrotechnical Commission).

MPEG-1 has already been recommended, and standardization of MPEG-2 is now under way.

The encoding method of MPEG is basically the same as that of H. 261 recommendation. Encoding of MPEG, which is provided is for storage media, greatly differs from that of H. 261, which is provided for communication, in processing for the time base. More specifically, various kinds of approaches are devised in order to respond to requests for quick feeding, rewinding, reproduction in the mid-course, and reverse reproduction.

First, it is defined to deal with data in units of a GOP (group of pictures) comprising a plurality of frames (N (=the number of frames of a GOP) parameters are set). A sequence header can be added to a GOP. By reproducing data in units of a GOP, it is possible to perform, for example, reproduction in the mid-course.

A plurality of frame types are present: I (Intraframe)-Picture, P (Predictive)-Picture, and B (Bidirectional)-Picture are defined (M (=periods of I-Picture and P-Picture) parameters are set).

In H. 261, I-Picture and P-Picture are used, and prediction only in the forward direction is used in the time base. On the other hand, in MPEG, all of the above-described three frame types are used, so that it is possible to perform decoding based on prediction in two directions in the time base, and to perform high-speed decoding by shortening the time base. It is thereby possible to deal with reverse reproduction, quick feeding, and the like. The size of the picture frame is not fixed, and can be changed in accordance with application.

Next, a description will be provided of JPEG. JPEG provides encoding of color still-picture data made by cooperation of the ITU-T and ISO/IEC, and has already been recommended. JPEG is the same as the above-described H. 261 and MPEG in that the transform encoding method comprises two-dimensional DCT, and differs from these standards in that methods for utilizing characteristics of a still picture are adopted.

First, Y (luminance) components and C (chrominance) components of DCT coefficients are quantized using different quantization matrices. DC components of the DCT coefficients are subjected to Huffman coding for DC components using each predictive value (DPCM) between the DC component of a block and the DC component of the block immediately left to that block. AC components of the DCT coefficients are subjected to Huffman coding for AC components after performing zigzag scanning of the DCT coefficients and performing zero-run-length encoding.

Quantization matrices and a Huffman-coding table can be freely set. Encoding/decoding can be performed by transferring the set values from the transmission side to the reception side in advance. It is thereby possible to perform encoding which is most suitable for the target still picture from the viewpoint of improving the picture quality, the encoding efficiency, and the like.

There is also a function of sequentially displaying images from rough images to very fine images in consideration of soft copy display on a display device. There are a display method using sequential encoding and a display method using progressive encoding according to the sequence of display. In JPEG, the latter method is adopted as an extension function, so that the applicational field can be widened.

In the pregressive encoding method, resolution and gradation are sequentially increased hierarchically from an image having low resolution and gradation in order to reach the final picture quality.

There are three kinds of progressive encoding methods, i.e., an SS (spectral selection) method, an SA (successive approximation) method, and a hierarchical method.

In the SS method, DCT coefficients are not transmitted all at once, but are transmitted by being divided into a plurality of blocks. Therefore, DCT coefficients are subjected to stepwise encoding in the direction of frequency.

In the SA method, A plurality of arbitrary number of bits from the most significant bit in DCT coefficients are encoded for all blocks within an image, and remaining lower bits are sequentially encoded and transmitted from upper bits at subsequent scanning operations. Therefore, DCT coefficients are subjected to stepwise encoding in the order of accuracy.

In the hierarchical method, the size of an image is pyramidally reduced to one powerth of two in the vertical and horizontal directions, compression encoding, such as DCT or the like, is performed in each pyramidal hierarchy, and the size of the image is sequentially increased. First, data of the most reduced image is encoded. Then, the difference between data of an image obtained by magnifying a decoded image of the encoded image twice and data of an image obtained by reducing the input image to the same size is subjected to DCT. This processing is repeated until the size of the image equals the size of the input image. This method has a feature in that terminals having different resolutions can be dealt with.

Another encoding method is a two-dimensional DPCM encoding metod (without DCT) which is a spatial encoding method. In this method, a predictive calculation operation using a target pixel and three surrounding pixels to be used for prediction is used as a predictive function. There are eight predictive calculation operations.

Figure 2:
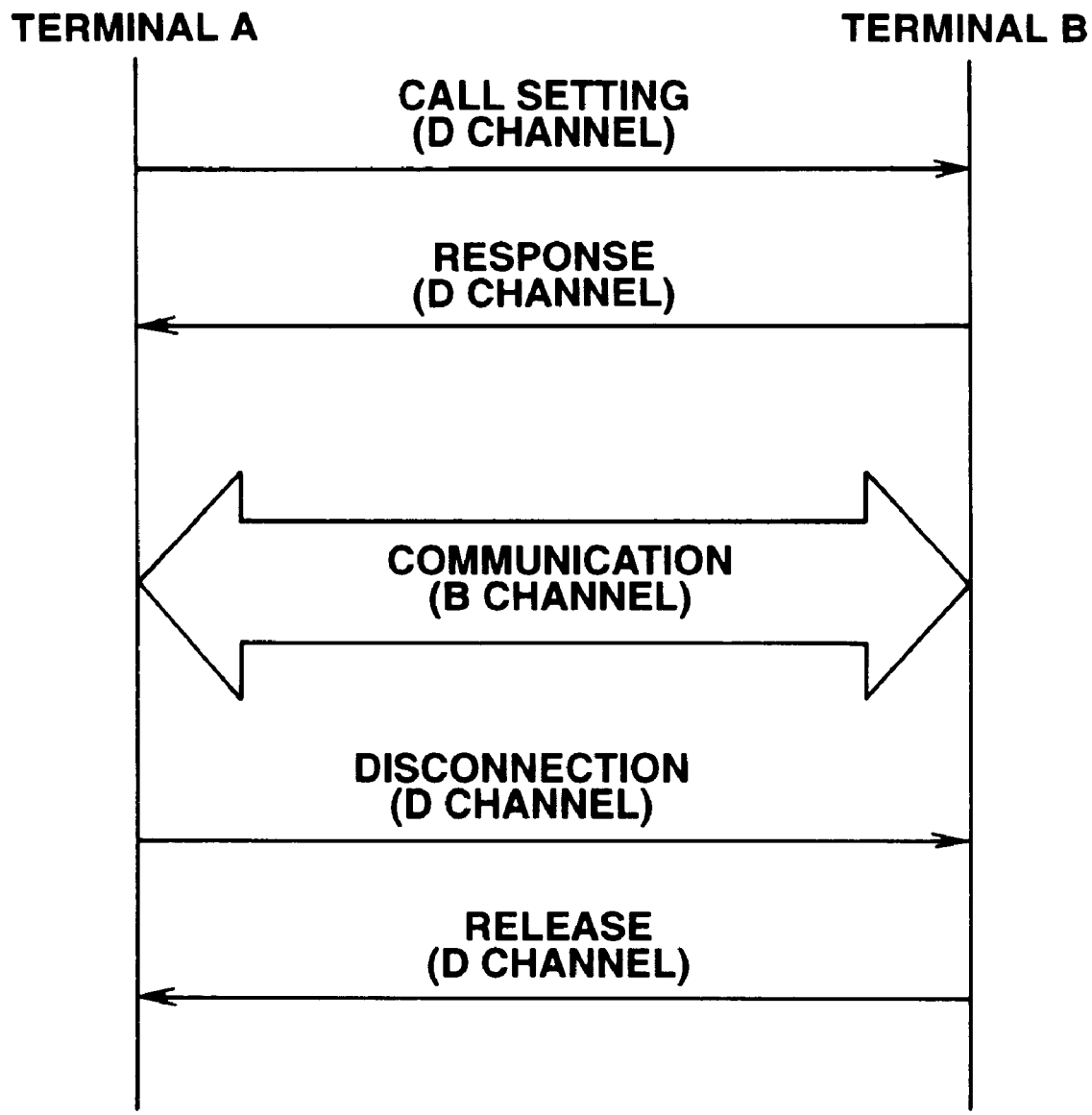
FIG. 2 is a diagram illustrating a procedure from call setting to disconnection in the apparatus shown in FIG. 1.

Next, a description will be provided of negotiation of capabilities of terminals and a method of changing the capabilities illustrating an ISDN. In the ISDN, as shown in FIG. 2, a call is effected using an outband signal (i.e., a D channel). As shown in FIG. 2, by call setting from terminal A to terminal B, and response from terminal B to terminal A, communication in a B channel is started. Although the D channel, H0 or H1 can also be used as a communication channel, a description will now be provided of only the B channel.

Figure 3:
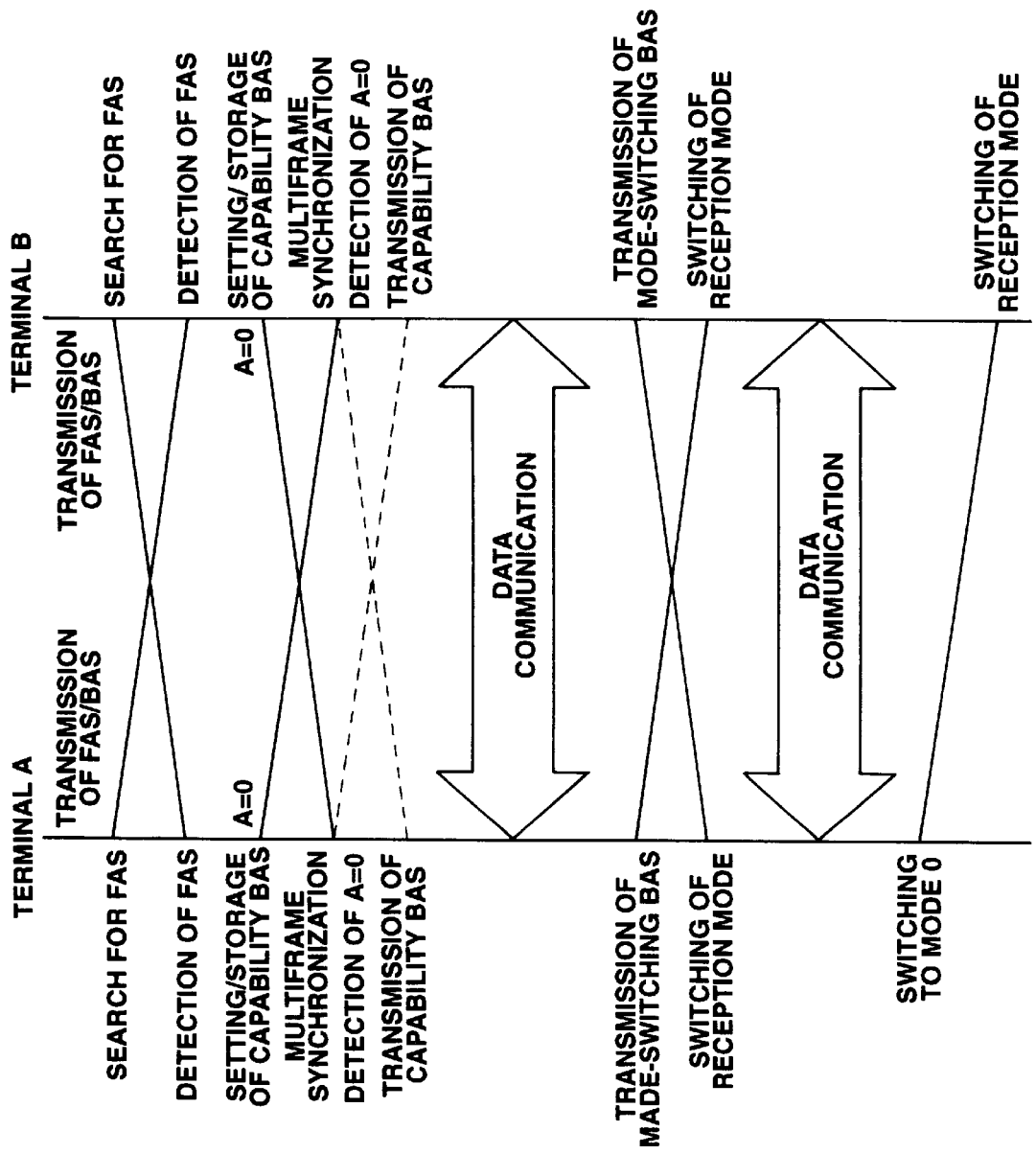
FIG. 3 is a diagram illustrating in-channel control in a B channel.

Using the B channel which has become in a communicatable state in the above-described manner, and conforming to the recommendation H. 242, in-band signal procedures (in which the inside of the B channel is allocated to a data unit and a control unit, and the control unit controls communication) are executed in the B channel as shown in FIG. 3, whereby the inside of the B channel is allocated to the data unit and the control unit.

Such control is termed in-channel control. Control bits are needed in the B channel for performing the in-channel control. The frame configuration of the inside of the B channel is provided by the recommendation H. 221.

The frame configuration of the inside of the B channel for executing the in-channel control is shown in FIGS. 4(a) through 4(c). FIGS. 4(a) through 4(c) illustrate the multiframe structure for the B channel (having a transfer rate of 64 Kbps).

This multiframe structure is configured by 1 frame=80 octets as shown in FIG. 4(a), 1 submultiframe=2 frames as shown in FIG. 4(b), and 1 multiframe=8 submultiframes as shown in FIG. 4(c), based on 1 octet/125 μsec. Subchannels #1 through #8 having a transfer rate of 8 Kbps are defined in the direction of bits. However, the transfer rate of the #8 subchannel is 6.4 Kbps, and an FAS and a BAS are inserted as control bits. According to the FAS and BAS, the in-channel control of the B channel can be performed.

The FAS is used for frame synchronization and multiframe synchronization. The BAS is used for the exchange of information relating to capabilities of terminals, or setting of capabilities, which are necessary for determining the multiplexing method for subchannels and the like. The BAS can be switched at every submultiframe (20 msec) even during communication.

In-band signal procedures shown in FIG. 3 will now be briefly described. When the B channel has become in a communicatable state, both terminal A and terminal B transmit FAS's. The capabilities of the terminals at that time correspond to mode 0 at the initial state (a mode only for audio, FAS and BAS). The FAS is searched for at the communication partner's terminal, which transmits data by making A in the bit configuration within the FAS shown in FIG. 5(a) "0" when conditions for establishing frame synchronization provided in H. 242 are satisfied. When the terminal receives A=0, it is confirmed that frame synchronization has been established at the terminal of the communication partner.

Thereafter, the transmission capabilities of the user's own terminal is transmitted to the terminal of the communication partner using a BAS, whereby the capabilities of the two terminals in communication are confirmed. This corresponds to so-called exchange of transmission capabilities.

If the two terminals are in a communicatable state at that time, communication of data is started. When one of the capabilities of a terminal must be changed, the desired capability of the terminal is transmitted as a command using a BAS. Communication of data is started after the communication partner's terminal has completed the setting of the capability.

Transmission and reception are independent of each other in data communication, and establishment of synchronization and the setting of capabilities of terminals are separately effected. Accordingly, asynchronization may occur in one direction, or the kind of data may differ in transmission and reception.

In order to disconnect a call after data communication has been completed, first, the terminal intending to disconnect the call (terminal A in the case of FIG. 3) provides mode 0 using a BAS. The in-channel control of the B channel thereby returns to the initial state. Then, as shown in FIG. 2, disconnection and release are performed in the outband procedure for the D channel, whereby the entire procedures of communication are completed.

FIGS. 5(a) through 5(c) illustrate the bit configuration within an FAS. Bit A represents the presence/absence of asynchronization, and bit E represents the generation of a CRC (cyclic redundancy check) error. C1, C2, C3 and C4 represent CRC bits. N1 through N5 are provided for numbering multiframes, and R1 through R4 are channel numbers. TEA represents an alarm for the terminal apparatus. Number "1" is set when an input signal cannot be received or responded due to a trouble within the apparatus.

FIGS. 6(a) and 6(b) illustrate the bit configuration within a BAS. As shown in FIG. 6(a), three significant bits represent attributes, and remaining five bits represent the values of the attributes. FIG. 6(b) illustrates the contents of attributes. The attribute values comprise, for example, a transfer-rate value, the kind of a codec, parameter values peculiar to respective media or information.

Control information (a BAS), voice data from the voice encoding unit 34, and image data from the image encoding unit 22, which are generated by the system control unit 12 in the above-described manner, are multiplexed by the multiplexing/separation unit 48 to be generated as data having the H. 221 format, and the resultant data is transmitted to the network interface unit 46.

Data having the H. 221 format received from the B channel is separated into control information (comprising an FAS and a BAS) and data of respective media (voice, an image and data) by the multiplexing/separation unit 48. Voice data, image data and control information are transferred to the voice decoding unit 36, the image decoding unit 22 and the system control unit 42, respectively.

Magnetic tapes, magnetic disks, optical disks such as magnetooptical disks and the like, and semiconductor memories can be used as storage media used in the storage unit 45.

The system control unit 42 controls information stored in the storage unit 45 in the following manner.

FIG. 7 illustrates a file control table relating to information stored in the storage unit 45 in units of a file.

The control information has the columns of the file name, the location of stored data (the start address and the data length), the kind of data (an image, voice, or the like), the transfer rate, the encoding method, and communication control parameters.

The file name comprises V (for an image) or A (for voice), briefly indicating an image file or a voice file, respectively, followed by a four-digit serial number. The serial numbers are consecutively provided in the sequence of time separately for image files and voice files.

Information relating to the transfer rate is necessary when reproducing data at the same speed as that during recording. Particularly in the case of images, the transfer rate is not determined by the encoding method as in the case of voice. Hence, information relating to the transfer rate is important. Since the capacity of the communication channel except that used for communicating voice and data is allocated to the transfer of images, the transfer rate for images momentarily changes in accordance with the situation of communication. Also as for voice data, as in the case of A0005 and A0006 shown in FIG. 7, the transfer rate of voice data differs as 64 Kbps and 56 Kbps in a non-frame mode not having the frame configuration of H. 221 and in a frame mode having the frame configuration of H. 221, respectively. Hence, care must be taken. Because of the above-described problems, it is desirable to record the transfer rate for each information at every recording operation. However, since non-real-time processing is performed for still-picture data in contrast to real-time processing performed, for example, for moving-picture data and voice data, there is no transfer rate for still-picture data.

FIG. 8 illustrates a control table for response messages to be provided during a mode of recording during absence. The control table has the columns of the message serial number, the number of the communication partner's terminal (not particularly assigned in some cases), the recording-time information (the start time and the recording time), the file name (of single image data and single voice data), the number of communication channels, and the data attribute (one each for an image and voice).

In the column of the numbers of the communication partner's terminal, at least one telephone number for specifying a terminal, to which a message is to be transmitted, is set. No particular terminal of the communication partner may be assigned. When transmitting a message utilizing a particular capability of the communication partner's terminal, the telephone number of that terminal is set.

The column of the start time for recording-time information may be void because information relating to the start time is unnecessary. However, it is clear that the time of recording of the message in the storage unit 45 may be set.

In FIG. 8, three image files V0003, V0004 and V0005, and four voice files A0003, A0004, A0005 and A0006 are registered as components for five messages.

When there is a communication operation from a terminal of the communication partner specified in the column of the numbers of the communication partner's terminal, one of messages for which the number of the communication partner's terminal is specified is selected in the sequence of serial numbers. If the selected message is not adapted to the capabilities of the communication partner's terminal, the next message is selected. If a message, for which the number of the communication partner's terminal is specified, and which corresponds to the capabilities of the communication partner's terminal, is absent, an adapted message is sequentially selected from among general-purpose messages each including both an image message and a voice message. If no adapted message is present, a message is sequentially selected from among messages each having only a voice message, and the selected message is transmitted to the communication partner's terminal.

For example, an image and voice having the same contents are encoded by different encoding methods (including a difference in the compression ratio) in messages having serial numbers 0001 and 0002. The same telephone numbers are registered in the column of the number of the communication partner's terminal. When there has been a communication operation from a number of the communication partner's terminal specified in the table, if the communication partner's terminal cannot deal with voice data of LD-CELP, the message of message serial number 0002 is transmitted. If the communication partner's terminal does not have image-receiving capabilities (for example, in the case of an ordinary telephone set using only voice), the message of message serial number 0003 or 0004 is transmitted.

FIG. 9 illustrate a control table of stored recording during absence. The table has the columns of the serial number of communication history, the number of the communication partner's terminal (void in the case of no notification), the recording-time information (the start time and the recording time), the file name (four each for image data and voice data), the number of communication channels, and the communication result.

In the present embodiment, received information having the same range of transmission form, including the transfer rate and the encoding method, is stored in the same file or block. That is, if the transfer rate or the encoding method is changed, the same image information is stored in a different file in the storage unit 45. Accordingly, a plurality of files are present even for image data and voice data having the same serial number of communication history. The column of the file name has four columns each for image data and voice data.

For example, as shown in FIG. 9, in communication-history serial number 000A, image files V0001 and V0006, and voice files A0001 and A0007 are present. In communication-history serial number 000B, image file V0002 and voice file A0002 are present. These files are time-serially controlled. The start time and the recording time are registered as the recording-time information, and the number of communication channels is also registered.

In communication-history number 000C, only still-picture data V0007 is present. Since a real-time property required for voice or a moving image is unnecessary, the columns for the recording time, the number of communication channels, and the like are void.

In communication-history number 000D, image files V0008 and V0009, and voice files A0008 and A0009 are registered. The column of the number of communication channels is void because the data comprise encoded data for storage.

Next, processing performed while a message is registered will be described with reference to FIG. 10. The system control unit 42 connects the selection switches 54 and 56 to contact "a" (step S1). Then, the operator inputs the transmission form (the encoding method and communication control parameters) through the operation unit 44. The system control unit 42 registers that information in the control tables (shown in FIGS. 7 and 8) (step S2), sets the file name in the storage unit 45 (step S3), and sets a storage region (step S4).

Image data output from the camera 10 or the document camera 12, or image data generated by the graphic generation unit 18 is encoded in an encoding method assigned through the operation unit 44, and encoded data is stored in a set file name in an assigned location in the storage unit 45. Voice data output from the handset 26 or the microphone 28 is encoded by the assigned encoding method, and encoded data is stored in a set file name in an assigned storage region in the storage unit 45 (steps S5, S6 and S7). Steps S5–S7 are repeated until all necessary data are stored (step S8).

Figure 11:
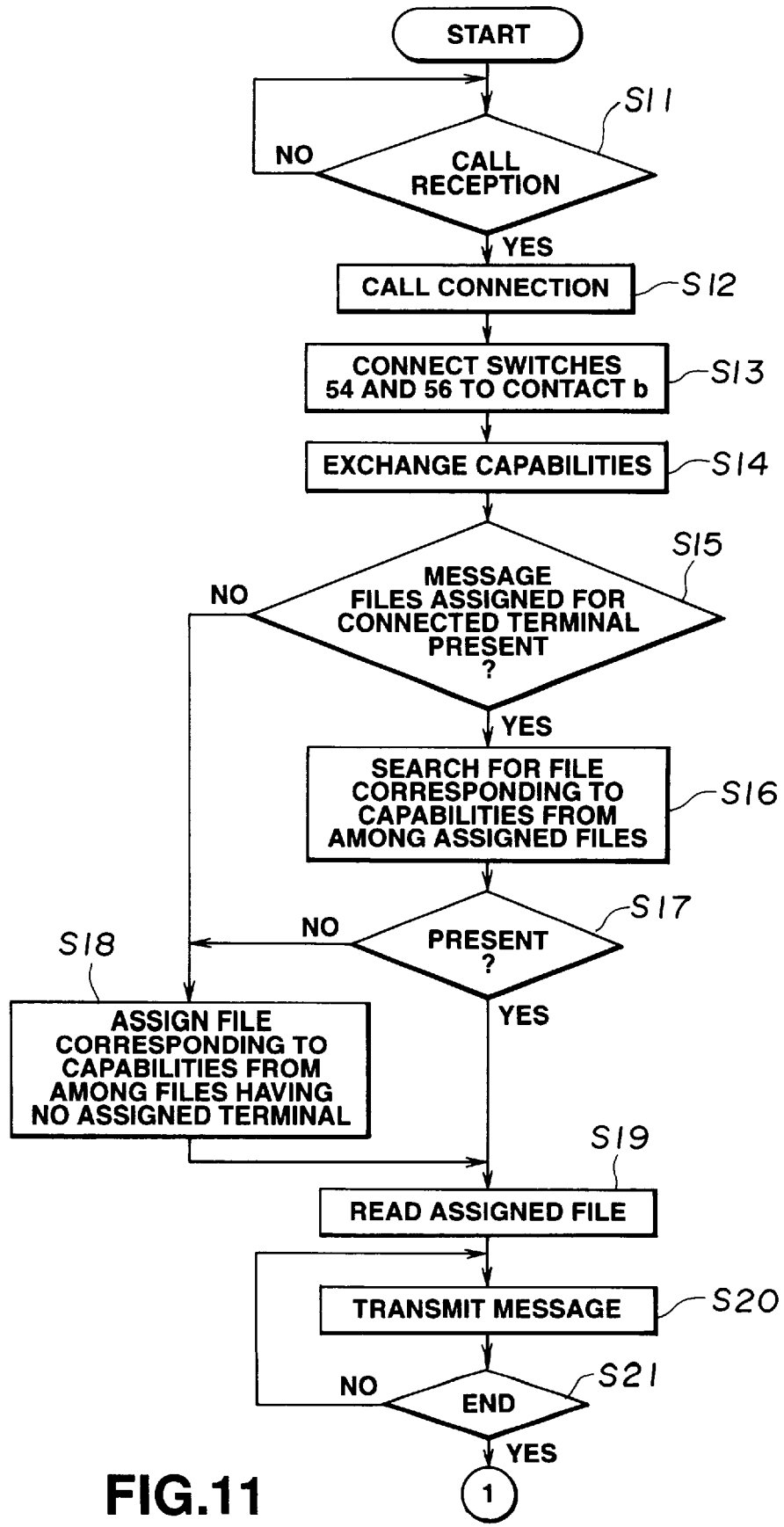
FIGS. 11 and 12 are flowcharts illustrating storage processing performed in a call-receiving operation in a mode of recording during absence.
Figure 12:
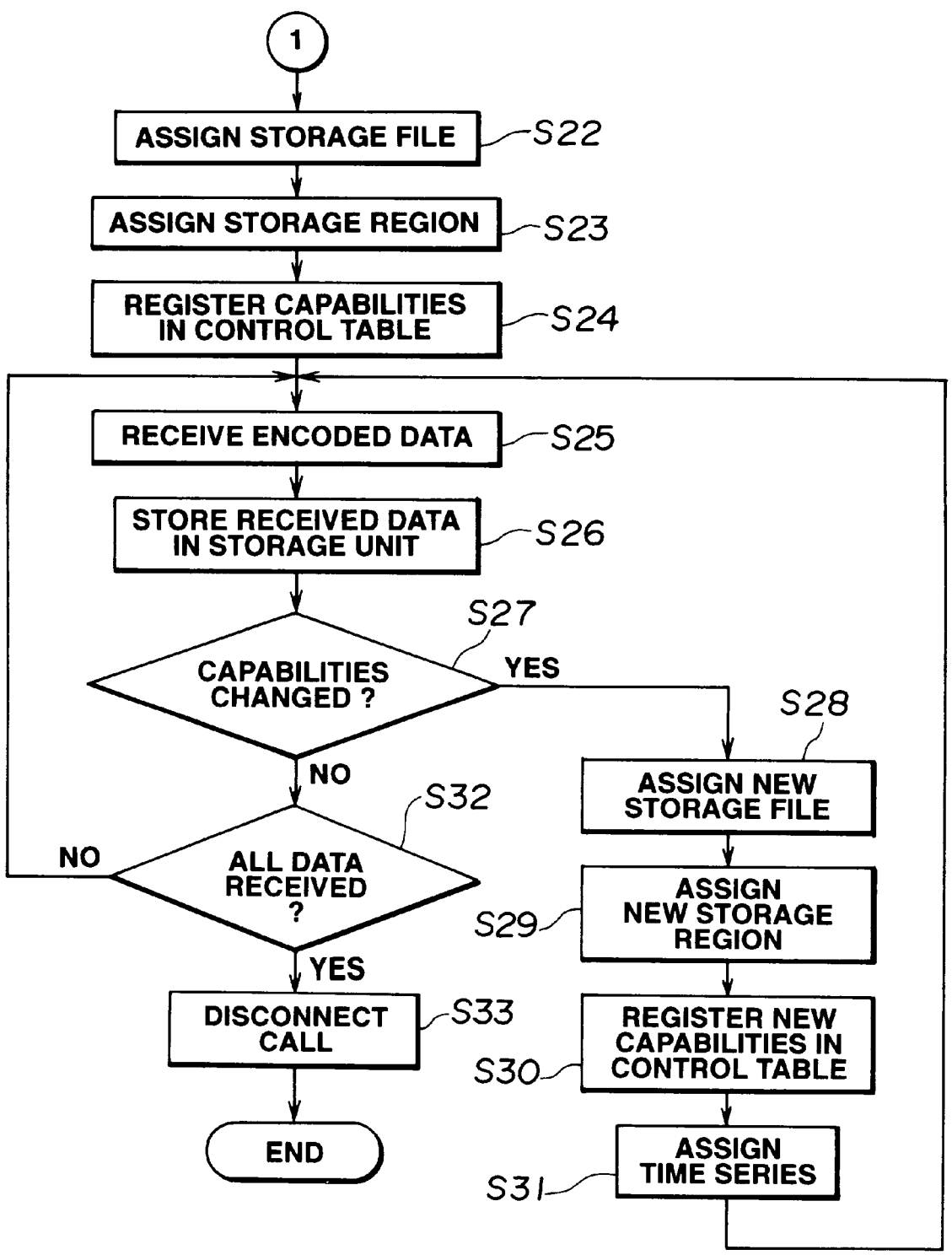

A description will now be provided of the processing of call reception in a mode of recording during absence with reference to FIGS. 11 and 12. First, call reception is awaited (step S11). When a call has been received, the call is connected (step S12). The selection switches 54 and 56 are connected to contact b (step S13), and capabilities are exchanged with the above-described communication partner's terminal (step S14).

Referring to the control table shown in FIG. 8, it is checked if message files assigned for the connected terminal are present from among registered messages (step S15). If the result of the check is affirmative, a message corresponding to the capabilities exchanged in step S14 is searched for from among the assigned messages (step S16). If such a message is present, the file of the message is read (step S19), and the message is transmitted (steps S20 and S21).

If a message corresponding to the capabilities of the communication partner's terminal is absent (in step S15 or S17), a message file corresponding to the capabilities exchanged in step S14 is assigned from among message files having no assigned terminal (step S18), the assigned file is read, and the message of the file is transmitted (steps S20 and S21).

After transmitting the message (step S21), the name of the storage file for image information and voice information to be received is assigned (step S22), and a storage region in the storage unit 45 is assigned (step S23). The capabilities of the communication partner's terminal are registered in the control tables shown in FIGS. 7 and 9 (step S24).

When encoded data has been received (step S25), the received data is stored in the storage unit 45 (step S26). If there is a change in the capabilities (step S27), a new storage file is assigned (step S28), a new storage region is assigned in the storage unit 45 (step S29), the new capabilities of the communication partner's terminal are additionally registered in the control tables shown in FIGS. 7 and 9 (step S30), a new file name is additionally registered in a column next to the final column of the control table shown in FIG. 9, and the time series of the registered files is assigned (step S31). For example, the time series is assigned by providing serial numbers for file names.

After the reception of encoded data has been completed (step S32), the processing of terminating communication is executed, the call is disconnected (step S33), and the process is terminated.

Figure 13:
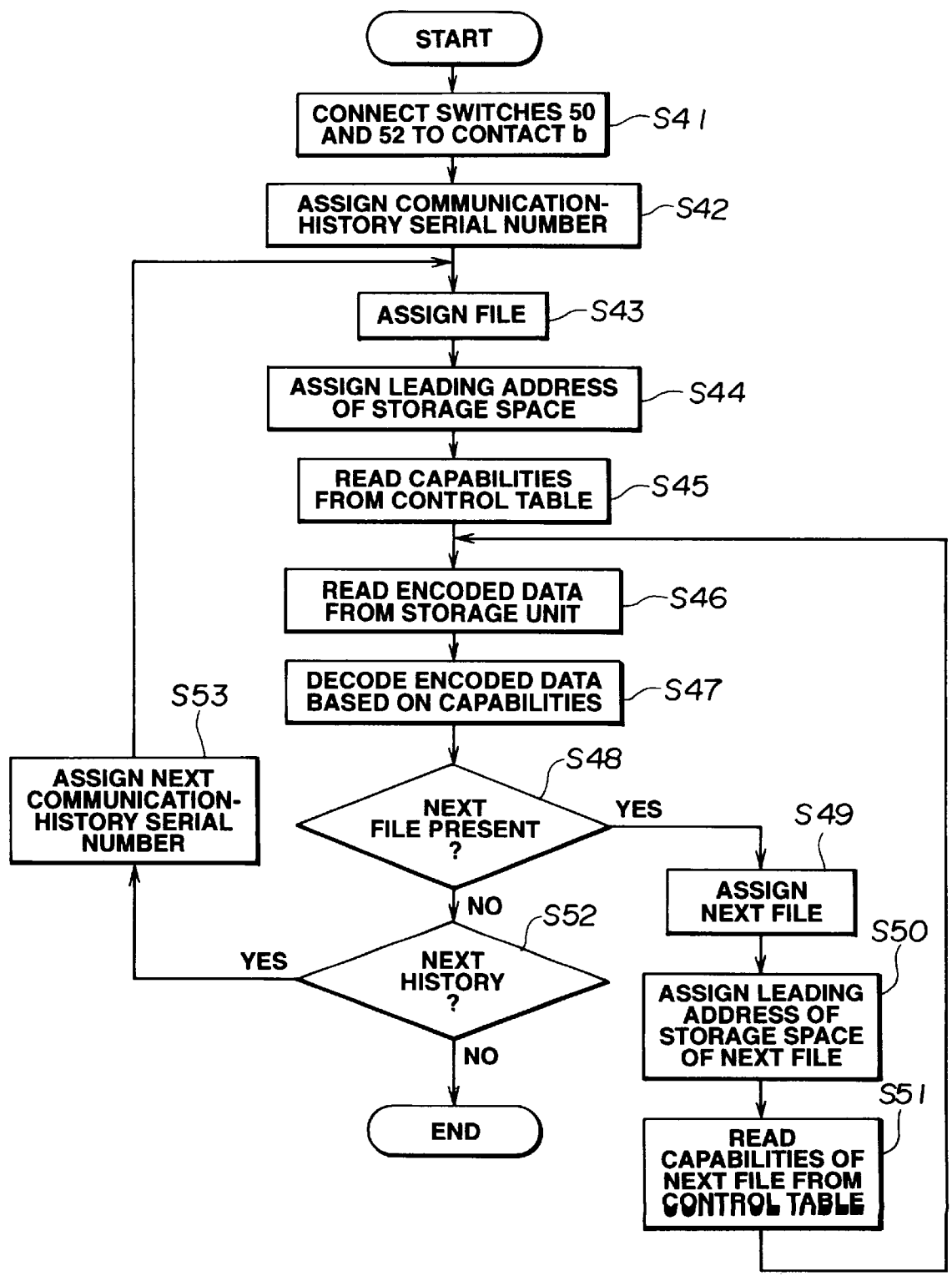
FIG. 13 is a flowchart illustrating processing of reproducing contents recorded during absence.

FIG. 13 is a flowchart illustrating the processing of reproducing the contents of recording during absence. The system control unit 42 connects the selection switches 50 and 52 to contact b (step S41). A communication-history serial number registered in the control table for recording performed during absence is assigned (step S42), and the file to be reproduced having that serial number is assigned (step S43). When automatic reproducing operations in the sequence of recording are assigned in steps S42 and S43, reproducing operations of recorded data are automatically performed in the sequence of registration of information recorded during absence shown in FIG. 9. However, the operator may assign a file recorded during absence, which is to be reproduced, by performing a manual input operation through the operation unit 44.

By referring to the file control table shown in FIG. 7, the leading address of the assigned file is set (step S44), capabilities, such as the encoding method and the like, are read, and conditions are set in the decoding units 24, 36, and the like in accordance with the read capabilities (step S45). Encoded data of the assigned file is read from the storage unit 45 in accordance with the transfer rate of recording during absence (step S46). The read encoded data is supplied to the decoding units 24 and 36 via the selection switches 50 and 52. The decoding units 24 and 36 decode the encoded data, input via the selection switches 50 and 52, in accordance with the conditions set in step S45 (step S47).

As in the case of the encoding units 22 and 34, each of the decoding units 24 and 36 comprises a plurality of decoding circuits corresponding to various kinds of encoding methods. By setting the above-described conditions, decoding processing is performed using a corresponding decoding circuit.

After encoded data of one file has been decoded (step S47), it is checked if the next file to be reproduced having the same communication-history serial number is present (step S48). If the next file is present (step S48), the next file is assigned (step S49), the leading address of the assigned file is assigned (step S50), the capabilities, such as the encoding method and the like, are read from the control table shown in FIG. 7 in the same manner as for the preceding file, and conditions are set in the decoding units 24, 36, and the like (step S51). The process then proceeds to step S46, where a decoding (reproducing) operation of the assigned file is executed.

When all files of the communication-history number assigned in step S42 have been reproduced, the presence of the next communication-history serial number to be reproduced is checked (step S52). If the result of the check is affirmative, the next communication-history serial number is assigned (step S53), and the processes after step S43 are repeated.

Although a description has been provided of communication through an ISDN, which serves as a communication network, the present invention may, of course, be applied to communication through any other communication network, provided that circuit switching can be performed, and a dedicated network is provided.

Also in communication by a packet switching method, such as a LAN (local area network), or the like, logical multiplexing can be performed by transferring image data, voice data, and data by delimiting each medium with a certain data length to provide packets. It is possible to collect data having the same transmission form extending over a plurality of packets into a file or a block, or to divide data having different transmission forms into separate files or blocks. Hence, the present invention may, of course, be applied to such a method.

Although a description has been provided of H. 221 recommendation as the multiplexing method, the present invention may, of course, be applied to any other method for separating and multiplexing image data, voice data and other data.

The present invention is not limited to the encoding methods described in the present embodiment, but may, of course, be applied to any other method.

Although in the present embodiment a function of recording during absence and a function of transmitting a message have been mainly described as applications of the present invention, the present invention is not limited to these applications.

For example, the present invention may be applied to a case in which in an apparatus for dealing with a plurality of encoded data having different transmission forms, operations, such as a recording operation, an editing operation, a reproducing operation, and the like, are locally performed without performing communication, or performed through communication by a remote control.

As can be easily understood from the foregoing description, according to the present embodiment, it is possible to reproduce the contents of recording during absence, even if there is a change in the capabilities of the communication partner's terminal in the course of communication with the communication partner's terminal, without being influenced by the change. It is also possible to transmit a message, which is most adapted to the capabilities of the communication partner's terminal, to the communication partner's terminal.

The individual components shown in outline or designated by blocks in the drawings are all well known in the multimedia information communication apparatus arts and their specific construction and operation are not critical to the operation or best mode for carrying out the invention.

While the present invention has been described with respect to what is presently considered to be the preferred embodiment, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A multimedia information communication apparatus comprising:

storage means for storing received information which changes into a plurality of different transmission states in a single communication operation;

detecting means for detecting the change of the transmission state of the received information in the single communication operation; and storage control means for storing the received information as one block in said storage means and for also storing the received information as another block in accordance with the detection result of the change of the transmission state.

2. An apparatus according to claim 1, wherein a transmission form includes a transfer rate.

3. An apparatus according to claim 1 or 2, wherein the transmission form includes an encoding method.

4. An apparatus according to claim 3 further comprising reproducing means for reproducing information stored in said storage means.

5. An apparatus according to claim 1 or 2, further comprising reproducing means for reproducing information stored in said storage means.

6. An apparatus according to claim 1, wherein the received information comprises image data which is compressed in accordance with MPEG.

7. An apparatus according to claim 1, wherein the received information is transmitted through a digital line.

8. An apparatus according to claim 1, wherein the received information is time-serially controlled.

9. A multimedia information communication method comprising:

a first storing step of storing in a storage means received information which changes into a plurality of different transmission states in a single operation;

a detection step of detecting the change of the transmission state of the received information in the single communication operation; and a second storing step of storing in the storage means received information as one block in said storage means and for also storing the received information as another block in accordance with the detection result of the change of the transmission state.

10. The method according to claim 9, wherein the received information comprises image data which is compressed in accordance with MPEG.

11. The method according to claim 9, wherein the received information is transmitted through a digital line.

12. The method according to claim 9, wherein the received information is time-serially controlled.

* * * * *

UNITED STATES PATENT AND TRADEMARK OFFICE
CERTIFICATE OF CORRECTION

PATENT NO. : 5,903,734

DATED : May 11, 1999

INVENTOR(S) : MAKOTO CHIDA

Page 1 of 3

It is certified that error appears in the above-identified patent and that said Letters Patent is hereby corrected as shown below:

COLUMN 1 line 39, "recuded" should read --reduced--.

COLUMN 2 line 28, "an" should read --a--;
   line 29, "analog" should read --to analog--;
   line 36, "alanog" should read --analog--; and
   line 58, "comminication" should read --communication--.

COLUMN 4 line 65, "voide" should read --voice--.

COLUMN 5 line 28, "seperates" should read --separates--.

UNITED STATES PATENT AND TRADEMARK OFFICE
CERTIFICATE OF CORRECTION

PATENT NO. : 5,903,734

DATED : May 11, 1999

INVENTOR(S) : MAKOTO CHIDA

It is certified that error appears in the above-identified patent and that said Letters Patent is hereby corrected as shown below:

COLUMN 10 line 12, "pregressive" should read --progressive--.

COLUMN 13 line 56, "illustrate" should read --illustrates--.

COLUMN 17 line 16, "form" should read --state--; and

UNITED STATES PATENT AND TRADEMARK OFFICE
CERTIFICATE OF CORRECTION

PATENT NO.  : 5,903,734

DATED       : May 11, 1999

INVENTOR(S) : MAKOTO CHIDA

It is certified that error appears in the above-identified patent and that said Letters Patent is hereby corrected as shown below:

COLUMN 17 continued line 18, "form" should read --state--.

Signed and Sealed this

Twenty-fifth Day of January, 2000

Attest:

Attesting Officer

Acting Commissioner of Patents and Trademarks